United States Patent [19]

Coles

[11] Patent Number: 4,515,955
[45] Date of Patent: May 7, 1985

[54] ISOINDOLINE CATIONIC DYES

[75] Inventor: Robert F. Coles, Lake Elmo, Minn.

[73] Assignee: Minnesota Mining and Manufacturing Company, St. Paul, Minn.

[21] Appl. No.: 355,324

[22] Filed: Mar. 8, 1982

[51] Int. Cl.$^3$ .................. C07D 413/06; C07D 417/06; C07D 403/06; D06P 1/42
[52] U.S. Cl. .................................... 548/150; 548/159; 548/181; 430/606; 8/655
[58] Field of Search ........................ 548/150, 159, 181

[56] References Cited

U.S. PATENT DOCUMENTS 3,646,033 2/1972 Leister et al. ...................... 260/230
4,030,932 6/1977 Chapman ............................. 96/127

OTHER PUBLICATIONS

Il'chenko and Radchenko, Dyanine Dyes with Isoindoline Ring in the Chromophore, Khim, Getero. Soldinenii, 1979, No. 4, pp. 44–458.
Kranz, Chem. Ber. 100, 2261–2273 (1967).
Kornilov, Ukr. Khimo Zh. 40, 1214(1974) abstract only.

Primary Examiner—Robert Gerstl
Attorney, Agent, or Firm—Donald M. Sell; James A. Smith; David L. Weinstein

[57] ABSTRACT

Isoindoline derivatives monosubstituted in the 1-position corresponding to the general formula

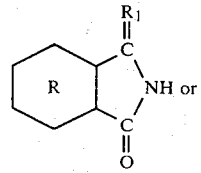

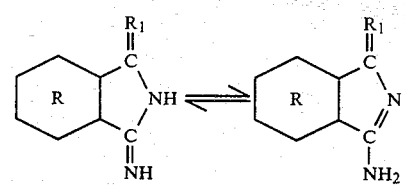

in which the cyclic radical R is an aromatic ring, a substituted aromatic ring, a tetrahydrogenated aromatic ring, a nitrogen-containing heterocyclic ring, or a sulfur-containing heterocyclic ring, and $R_1$ is a substituent represented by the general formula

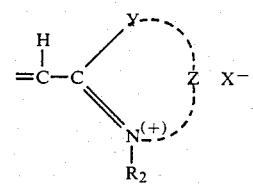

where Y is an atom of oxygen, nitrogen, sulfur, or carbon, Z is the atom or atoms necessary to form a 5-membered or 6-membered heterocyclic ring which may have a fused-on aromatic ring selected from phenyl and naphthyl groups, $R_2$ is an alkyl, sulfoalkyl, or carboxyalkyl radical, and $X^-$ is the anion for the cationic quaternary nitrogen. The derivatives are dyes having hydrophilic properties. They are useful for dyeing and printing textile fibers and for photographic applications.

13 Claims, No Drawings

ISOINDOLINE CATIONIC DYES

BACKGROUND OF THE INVENTION

This invention relates to novel isoindoline derivatives and to a process for producing these derivatives.

It is known that various heterocylic nuclei can be advantageously incorporated into dye structures to create or enhance photographic utility of the dye. Dyes containing isoindole nuclei are also known, such as the azadicarbocyanine dyes disclosed in Il' chenko and Radchenko in Khim. Getero. Soldinenii, 1971, at pp. 454-458. However, these isoindole dyes have not proven to be useful as spectral sensitizing dyes.

Leister, et al, U.S. Pat. No. 3,646,033 discloses isoindoline derivatives asymetrically substituted in the 1- and 3-position corresponding to the general formula

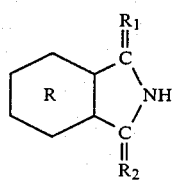

in which the cyclic radical R is an aromatic ring, a substituted aromatic ring, a tetrahydrogenated aromatic ring, a nitrogen-containing heterocyclic ring, or a sulfur-containing heterocyclic ring, and $R_1$ and $R_2$, which are different, are bivalent radicals of a compound which contains two active hydrogen atoms attached to a carbon or nitrogen atom, and a two stage process for making the same. The isoindoline derivatives are excellent dyestuffs for dyeing and printing synthetic fiber materials.

Chapman, U.S. Pat. No. 4,030,932 discloses sensitizing dyes containing an isoindole nucleus represented by the formula

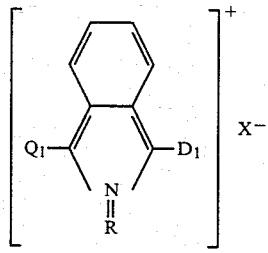

wherein R is an alkyl or substituted alkyl group; $Q_1$ is a methine chain having an odd number of carbon atoms terminated with a nitrogen atom contained in a basic heterocyclic nucleus of the type used in cyanine dyes; $D_1$ is a halogen atom, an alkoxy group, or a methine chain having an even number of carbon atoms terminated with a nitrogen atom contained in a basic heterocyclic nucleus of the type used in cyanine dyes; and $X^-$ represents an anion.

It is an object of this invention to provide a isoindoline cationic dye which is suitable for dyeing a wide variety of natural and synthetic fabrics.

It is another object to provide an isoindoline cationic dye which is suitable for modifying the sensitivity of silver halide emulsions.

SUMMARY OF THE INVENTION

This invention is involved with a novel dye which is useful for dyeing and printing textile fibers and for photographic applications. The dyes are isoindoline derivatives monosubstituted in the 1-position corresponding to the general formula

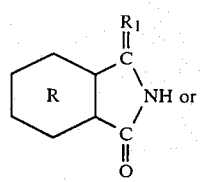

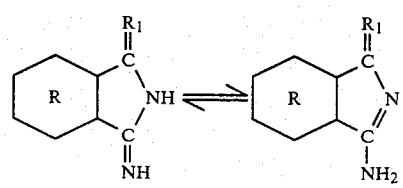

in which the cyclic radical R is an aromatic ring, a substituted aromatic ring, a tetrahydrogenated aromatic ring, a nitrogen-containing heterocyclic ring, or a sulfur-containing heterocyclic ring, and $R_1$ is a substituent represented by the general formula

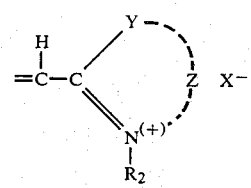

where Y is an atom of oxygen, nitrogen, sulfur, or carbon, Z is the atom or atoms necessary to form a 5-membered or 6-membered heterocyclic ring which may have a fused-on aromatic ring selected from phenyl and naphthyl groups, $R_2$ is an alkyl, sulfoalkyl, or carboxyalkyl radical, and $X^-$ is the anion for the cationic quaternary nitrogen.

The dye can be used on both natural and synthetic fabrics to impart colors ranging from yellow to orange. The dye is also useful in the area of photographic film for modifying silver halide sensitivity.

DETAILED DESCRIPTION OF THE INVENTION

The present invention relates to novel sensitizing dyes containing isoindole nuclei which are monosubstituted in the 1-position. The dyes contain an isoindole nucleus having a substituent at the 1-position which is linked by a methine carbon to a quaternized heterocyclic base, and a substituent at the 3-position which is an oxygen atom, an =N—H group, or the tautomeric $NH_2$ group. The dyes have hydrophilic properties.

In a preferred form, a dye of the invention comprises an isoindole nucleus, i.e.

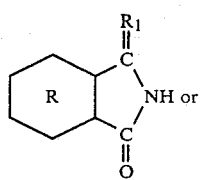

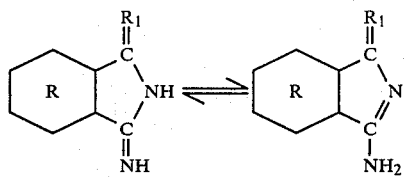

having a substituent $R_1$ at the 1-position having the following general formula

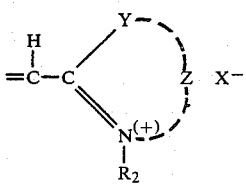

wherein Y is oxygen, sulfur, nitrogen, or carbon, Z is the atom or atoms necessary to form a 5-membered or 6-membered heterocyclic ring which may have a fused-on aromatic ring selected from phenyl and naphthyl groups, said heterocyclic ring preferably consisting of carbon, nitrogen, sulfur, oxygen, or selenium ring atoms, more preferably at least three carbon atoms, $R_2$ is an alkyl, sulfoalkyl, or carboxyalkyl radical, and $X^-$ is the anion for the cationic nitrogen.

The dyes may be prepared by reacting one mole of a 2-methyl heterocyclic quaternary salt with one mole of either (a) a diiminoisoindoline, or (b) a 3-iminophthalimidine hydrochloride. The reactions are shown schematically below:

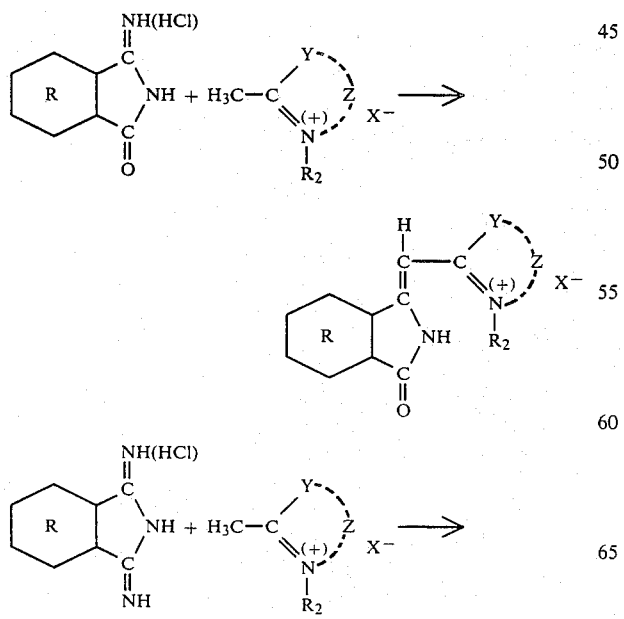

-continued

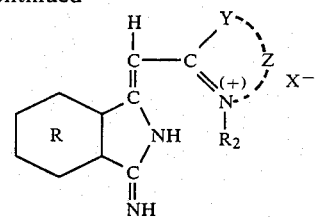

The dyes formed by the foregoing reactions are generally yellow to orange and are useful for applications requiring this color range. This may be contrasted with dyes obtained by disubstitution. For example, if two moles of a quaternary salt of 2-methyl benzothiazole is condensed with 1,1,3-trichloroisoindolinine, a blue dye ($\lambda$max 623 nm) is produced as the substituted product.

The dyes of the present invention have a hydrogen atom in the 2-position of the isoindoline nucleus. Furthermore, the 3-position is substituted by an oxygen or by an imino or its tautomeric amino group. The dyes disclosed in U.S. Pat. No. 4,030,092 require the presence of an alkyl group in the 2-position of the isoindole ring to prevent nitrogen participation in the dye chromophore.

The monocationic dyes of the present invention having a hydrogen atom in the 2-position are useful for altering photographic spectral characteristics. In particular, the dyes of the present invention are extremely useful in photographic applications requiring desensitization and where other photographic characteristics such as high contrast, good differentiation toward high and low intensity exposures, low stain level, etc. are obtained.

Dyes of the present invention can be prepared by methods which are best described by reference to specific examples. It will be understood, however, that variations and modifications can be effected within the spirit and scope of the invention as described hereinabove, and as defined in the appended claims.

EXAMPLE I

2-[(3-iminoisoindol-1-yl)methylene]-3-carboxyethyl benzothiazolium bromide

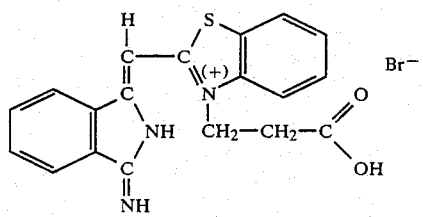

Three grams (0.02 mole) of 1,3-diiminoisoindoline was dissolved in 25 ml of warm water. Three grams (0.01 mole) of 2-methyl-3-carboxyethyl benzothiazolium bromide was added to the solution. A molar excess of 1,3-diiminoisoindoline was employed to avoid bis substitution. The solution was stirred and heated on a steam bath for 10 minutes. An orange solid separated from the solution. The solution was then cooled and the solid collected by filtration. The dye was redissolved in hot water with the aid of sodium hydroxide. The solution was filtered, and the filtrate was acidified with excess acetic acid to reprecipitate the dye. The dye was washed with water and methanol and vacuum dried at 70° C.

The dye was dissolved in water with the aid of sodium hydroxide. A strip of Multifiber Fabric #5 (13 fiber fabric) from Testfabrics, Inc. was dyed in a hot bath with the aforementioned dye solution. The fabric was then washed with water and dried. The acetate, nylon, viscose, cotton, wool, and silk fibers were dyed substantively.

EXAMPLE II

2-[(3-iminoisoindol-1-yl)methylene]-3-methyl benzothiazolium methosulfate

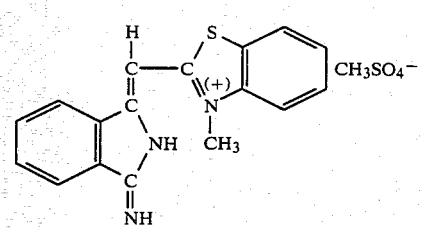

Four grams of 1,3-diiminoisoindoline was dissolved in 25 ml of warm methanol. The diiminoisoindoline is commercially available as Phthalogen Brilliant Blue 1F3G. The solution was treated with 5.5 grams of 2,3 dimethyl-benzothiazolium methosulfate which had been dissolved in 25 ml of methanol. An orange solid separated from the solution. The solution was then heated on a steam bath. Most of the solid dissolved and then recrystallized as an orange-red solid. After 10 minutes, the hot solution was filtered, and the solids were washed with methanol until the dark precipitate became yellow. The solid was washed with acetone and then vacuum dried at 60° C. The resulting product weighed 3.8 grams.

The dye was dissolved in water. A strip of Multifiber Fabric #5 (13 fiber fabric) from Testfabrics, Inc. was dyed in a hot bath with the aforementioned dye solution. The fabric was then washed with water and dried. The acetate, nylon, viscose, cotton, wool and silk fibers were dyed substantively.

EXAMPLE III

2-[(3-iminoisoindol-1-yl)methylene]-3-methyl thiazolinium p-toluene sulfonate

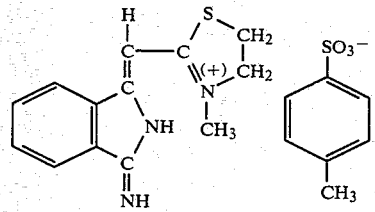

Three grams of 1,3-diiminoisoindoline were dissolved in 25 ml of methanol. The solution was treated with 5.7 grams of 2,3-dimethyl thiazolinine p-toluenesulfonate which had been dissolved in 25 ml of methanol. The resulting mixture was heated at reflux for several hours. A yellow solid was obtained upon cooling and scratching the vessel. The solid was collected and washed free of the dark colored mother liquor with methanol and acetone. The dye was then dissolved in hot water from which it was recrystallized. The dye can be converted to other salts by adding an anion, such as iodide, to give a more insoluble salt.

A strip of Multifiber Fabric #5 (13 fiber fabric) from Testfabrics, Inc. was dyed in a hot aqueous bath containing the above dye. The fabric was then washed with water and dried. The acetate, nylon, viscose, cotton, wool and silk fibers were substantively dyed.

EXAMPLE IV

2-[(3-iminoisoindol-1-yl)methylene]-3-ethyl-$\beta$-naphthiazolium p-toluene sulfonate

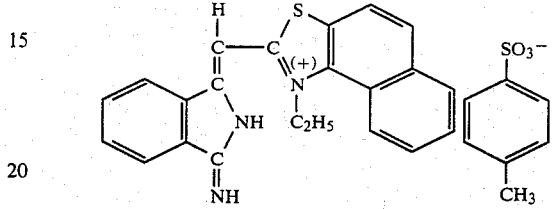

Three grams (0.02 mole) of 1,3-diiminoisoindoline was dissolved in 25 ml of methanol. The solution was treated with 7.7 grams (0.02 mole) of 3-ethyl-2-methyl-$\beta$-naphthiazolium p-toluene sulfonate which had been dissolved in 25 ml of methanol. The resulting solution darkened rapidly. It was then heated at reflux for one hour. The resulting precipitate was then collected by filtration. The solid was washed with methanol and acetone, and then dried.

The dye produced was quite insoluble in water. However, it can be treated with sodium hydroxide to convert it to the anhydrobase, which is soluble in hot methanol. It can be treated with acetic acid to convert it to the acetate, which is soluble in water. The addition of sodium chloride to the acetate precipitated the chloride salt, which can be crystallized from water.

EXAMPLE V

2-[(3-oxoisoindol-1-yl)methylene]-3-ethyl-benzothiazolium chloride

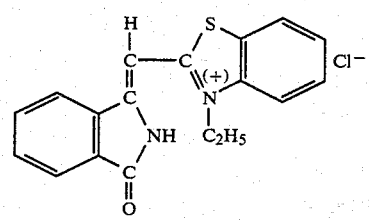

A mixture of 4.5 grams (0.015 mole) of 2-methyl-3-ethyl benzothiazolium iodide, 2.9 grams (0.0158 mole) of 3-iminophthalimidine hydrochloride (prepared according to the process of J. Kranz, Chem. Ber. 100, 2261-2273 (1967)), and 1.9 grams (0.16 mole) of anhydrous sodium acetate in 50 ml of isobutyl alcohol was heated on a steam bath for one hour. After a brief period, an orange solid separated and the contents of the vessel set nearly solid. An additional 30 ml of isobutyl alcohol was added. After cooling, the solid was collected by filtration, and washed successively with isobutanol, water, and acetone. The product was only slightly soluble in water, but it can be crystallized from hot methanol or ethanol. The product can be converted to the more soluble chloride salt by suspending in hot water and acidifying with excess hydrochloric acid. The solution thus obtained yields a precipitate of the quaternary chloride salt upon treatment with saturated sodium chloride solution followed by cooling.

A strip of Multifiber Fabric #5 (13 fiber fabric) was dyed in a hot aqueous solution of the dye. The fabric was then washed with water and dried. The acetate, nylon, silk and wool fibers were strongly dyed in lemon yellow shades.

EXAMPLE VI

2-[(3-oxoisoindol-1-yl)methylene]-3-carboxyethyl benzothiazolium bromide

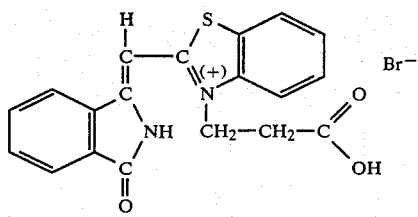

A mixture of 4.5 grams (0.015 mole) of 2-methyl-3-carboxyethyl benzothiazolium bromide, 2.9 grams (0.015 mole) 3-iminophthalimidine hydrochloride, and 1.9 grams (0.016 mole) anhydrous sodium acetate in 60 ml of absolute ethanol was heated on a steam bath for one hour. After a few minutes, the mixture had turned orange red and the separated solid became thick. The reaction mixture was cooled, filtered, and the solid was washed successively with cold ethanol and then acetone.

The solid, which was soluble in water, was dissolved in 100 ml of hot water. The solution was filtered, and the filtrate was acidified with about 3 ml of glacial acetic acid. The product crystallized, and, upon cooling, the solid was collected, and washed successively with water and acetone, and dried. A Beilstein test revealed the presence of halogen.

The dye is slightly soluble in water, but is readily soluble upon the addition of sodium acetate. The addition of sodium acetate yields an orange solution. Upon the addition of excess hydrochloric acid, the solution becomes a bright lemon yellow from which a yellow dye crystallizes on cooling. This dye is readily soluble in hot water.

The dyeing of a strip of Multifiber Fabric #5 from Testfabrics, Inc. in accordance with the procedure set forth in the previous Examples showed that the dye produces a strong yellow substantive dyeing of acetate, nylon, silk, veral A, and wool. Arnel (dull) and cotton (raw) are weakly dyed.

EXAMPLE VII

This example demonstrates how the compounds prepared in Examples I, II, III, IV, V, and VI affect the sensitivity of silver halide emulsions. Low intensity reciprocity failure (L.I.R.F.) is an effect whereby a silver halide emulsion may become insensitive to low intensity exposures even at extended exposure times. It is possible by the use of specific additives to accentuate this effect to such an extent that a silver halide emulsion cannot be fogged by low intensity light even after many hours exposure. By suitable choice of silver halide emulsion and additive it is possible to arrange that the normal level of white room-lighting is below the lower limit of intensity by which the emulsion can be exposed. Emulsions modified in this way may still be exposed by exposing radiation of higher intensity than normal room light.

Compounds which promote this effect will hereafter be referred to as "L.I.R.F. inducers". The application of L.I.R.F. inducers to white light handleable photographic film has been described in Professional Printer, 1981, Vol. 25(2), page 9.

There are many classes of organic compounds which act as desensitizers towards silver halide emulsions. Many desensitizers towards silver halide emulsions also act to some extent as L.I.R.F. inducers. (J. Opt. Soc. Amer., 1955, 45, 15; and Phot. Sci. Eng., 1967, 11, 82). However, not all compounds which are known to be desensitizers are equally efficient in this respect. A compound could not be predicted to be useful as a L.I.R.F. inducer for white light handleable film simply from the knowledge that it is a desensitizer. Furthermore, not all compounds which are L.I.R.F. inducers are equally useful to white light handling film, since many such compounds cause the latent image present on imaged film to fade when the film is exposed to room light even though the intensity of the room light may be insufficient to cause fogging.

In this example, the compounds prepared in Examples I-VI, inclusive, are compared with pinakryptol yellow and phenosafranine, both of which are conventional desensitizers.

A fine-grained silver halide emulsion consisting of 98% silver chloride and 2% silver bromide was prepared by a conventional double jetting technique. The emulsion was coagulated with sodium sulfate and washed normally. The coagulum was reconstituted with gelatin solution to give a final gelatin content of 80 g per mole of silver. At coating, the emulsion was divided into 0.1 mole portions and each additive, as indicated in Table 1 was added to a respective portion of the emulsion in methanol solution prior to addition of wetting agent and hardener. The pH of the emulsions was adjusted to pH 5 and the emulsions were coated on polyester base.

The coatings were exposed under two conditions:
(a) behind a step density wedge to a 5 kW metal halide doped mercury discharge lamp (Philips HPM 17) at a distance of 1 meter, and
(b) a low intensity exposure, a 80 Watt "warm white" fluorescent tube at a distance of 5 feet for 5 minutes.

The coatings were developed in a phenidone hydroquinone graphic arts rapid access developer for 20 seconds at 40° C. and fixed in Fixaplus, a thiosulfate fixer commercially available from May & Baker, at 40° C. for 20 seconds. The results of the exposures are reported in Table 1 in which:
Column A reports the relative exposure required to give a density of 1.0 when the material was exposed with a 5000 Watt Philips HPM 17 metal halide discharge lamp for 5 seconds at a distance of 1 meter through a continuous density wedge.
Column B reports the average contrast of the coating exposed as in Column A and measured between a density of 0.04 and 0.2 above background fog.
Column C reports the fog density which results from exposure of the coating to an 80 Watt Thorn "warm white" fluorescent tube at a distance of 1.5 meters for 5 minutes.

TABLE 1

| Desensitizer | Example | G/mole Silver | A | B | C |
|---|---|---|---|---|---|
| 2-[(3-iminosoindol-1-yl)methylene]-3-carboxyethyl-benzothiazolium bromide | I | 0.2 | 15.1 | 0.62 | 0.07 |
| 2-[(3-iminoisoindol-1-yl)methylene]-3-methyl-benzothiazolium methosulfate | II | 0.2 | 19.9 | 0.73 | 0.06 |
| 2-[(3-iminoisoindol-1-yl)methylene]-3-methyl-thiazolinium-p-toluene sulfonate | III | 0.1 | 19.9 | 0.64 | 0.08 |
| 2-[(3iminoisoindol-1-yl)methylene]-3-ethyl-β-naphthiazolium-p-toluene sulfonate | IV | 0.2 | 8.7 | 0.44 | 0.14 |
| 2-[(3-oxoisoindol-1-yl)methylene]-3-ethyl-benzothiazolium chloride | V | 0.8 | 28.1 | 0.53 | 0.06 |
| 2-[(3-oxoisoindol-1-yl)methylene]-3-carboxyethyl benzothiazolium bromide | VI | 0.8 | 12.5 | 0.53 | 0.06 |
| Pinakryptol yellow | | 0.1 | 33.0 | 0.52 | 0.14 |
| Phenosafranine | | 0.1 | 10.5 | 0.53 | 0.30 |
| None | | 0.0 | 1.0 | 0.73 | 3.50 |

The compounds which are most useful for imparting white light handleability to a silver halide material are those which have a small effect on the sensitivity towards high intensity exposure and a large effect in reducing the sensitivity of the emulsion to low intensity (room light exposure). Thus, the most effective L.I.R.F. inducers should have a low value in both Columns A and C in Table 1. It will be noted from Table 1 that the compounds used in accordance with the invention compare favorably with those of the prior art and in many cases are significantly superior as L.I.R.F. inducers.

What is claimed is:

1. Isoindoline derivative monosubstituted in the 1-position corresponding to the formula

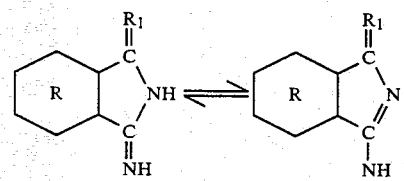

wherein the cyclic radical R is an aromatic ring, and $R_1$ is a substituent represented by the general formula

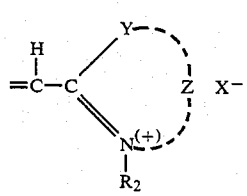

where Y is an oxygen, nitrogen, sulfur, or carbon atom, Z is the atom or atoms necessary to form a 5-membered or 6-membered heterocyclic ring, said heterocyclic ring consisting of atoms selected from the group consisting of carbon, nitrogen, sulfur, oxygen, and selenium ring atoms, $R_2$ is an alkyl, sulfoalkyl, or carboxyalkyl radical, and $X^-$ is the anion for the cationic quaternary nitrogen.

2. The isoindoline derivative of claim 1 wherein $R_1$ is

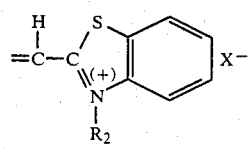

3. The isoindoline derivative of claim 1 wherein $R_1$ is

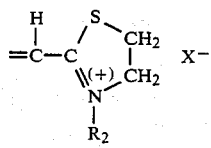

4. The isoindoline derivative of claim 1 wherein $R_1$ is

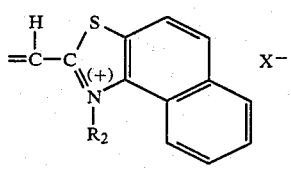

5. Isoindoline derivative monosubstituted in the 1-position corresponding to the formula

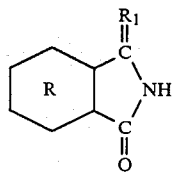

wherein the cyclic radical R is an aromatic ring, a substituted aromatic ring, a tetrahydrogenated aromatic ring, a nitrogen-containing heterocyclic ring, or a sulfur-containing heterocyclic ring, and $R_1$ is a substituent represented by the general formula

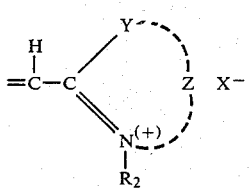

where Y is an oxygen, nitrogen, sulfur, or carbon atom, Z is the atom or atoms necessary to form a 5-membered or 6-membered heterocyclic ring which may have a fused-on aromatic ring selected from phenyl and naphthyl groups, $R_2$ is an alkyl, sulfoalkyl, or carboxyalkyl radical, and $X^-$ is the anion for the cationic quaternary nitrogen.

6. The isoindoline derivative of claim 5 wherein $R_1$ is

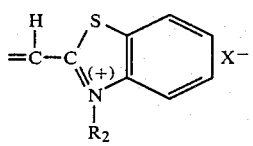

7. A process for the production of the product of claim 1, which comprises reacting an isoindoline compound of the general formula

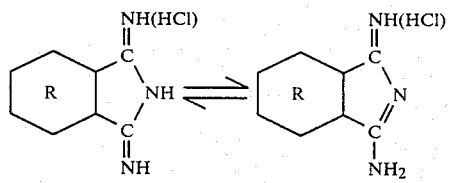

wherein R has the meaning given above, with a second compound having the general formula

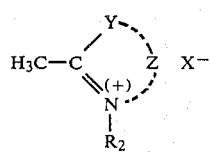

wherein Y has the meaning given above, Z has the meaning given above, $R_2$ has the meaning given above, and $X^-$ has the meaning given above.

8. The process of claim 7 wherein

Y is 

9. The process of claim 7 wherein

Y is 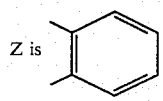

Z is 

10. The process of claim 7 wherein

Y is 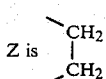

Z is 

11. A process for the production of the product of claim 5, which comprises reacting an isoindoline compound of the general formula

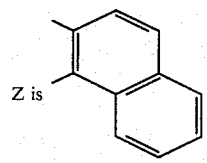

wherein R has the meaning given above, with a second compound having the general formula

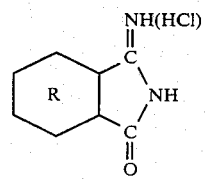

wherein Y has the meaning given above, Z has the meaning given above, $R_2$ has the meaning given above, and $X^-$ has the meaning given above.

12. The process of claim 11 wherein

Y is 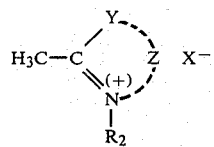

Z is 

13. The isoindoline derivative of claim 1 wherein the cyclic radical R is a phenylene group.

* * * * *